F. A. McDANIELS.
COMBINATION TRACTION DRIVEN HAND TOOL.
APPLICATION FILED FEB. 27, 1913.
1,115,854.
Patented Nov. 3, 1914.
3 SHEETS—SHEET 1.
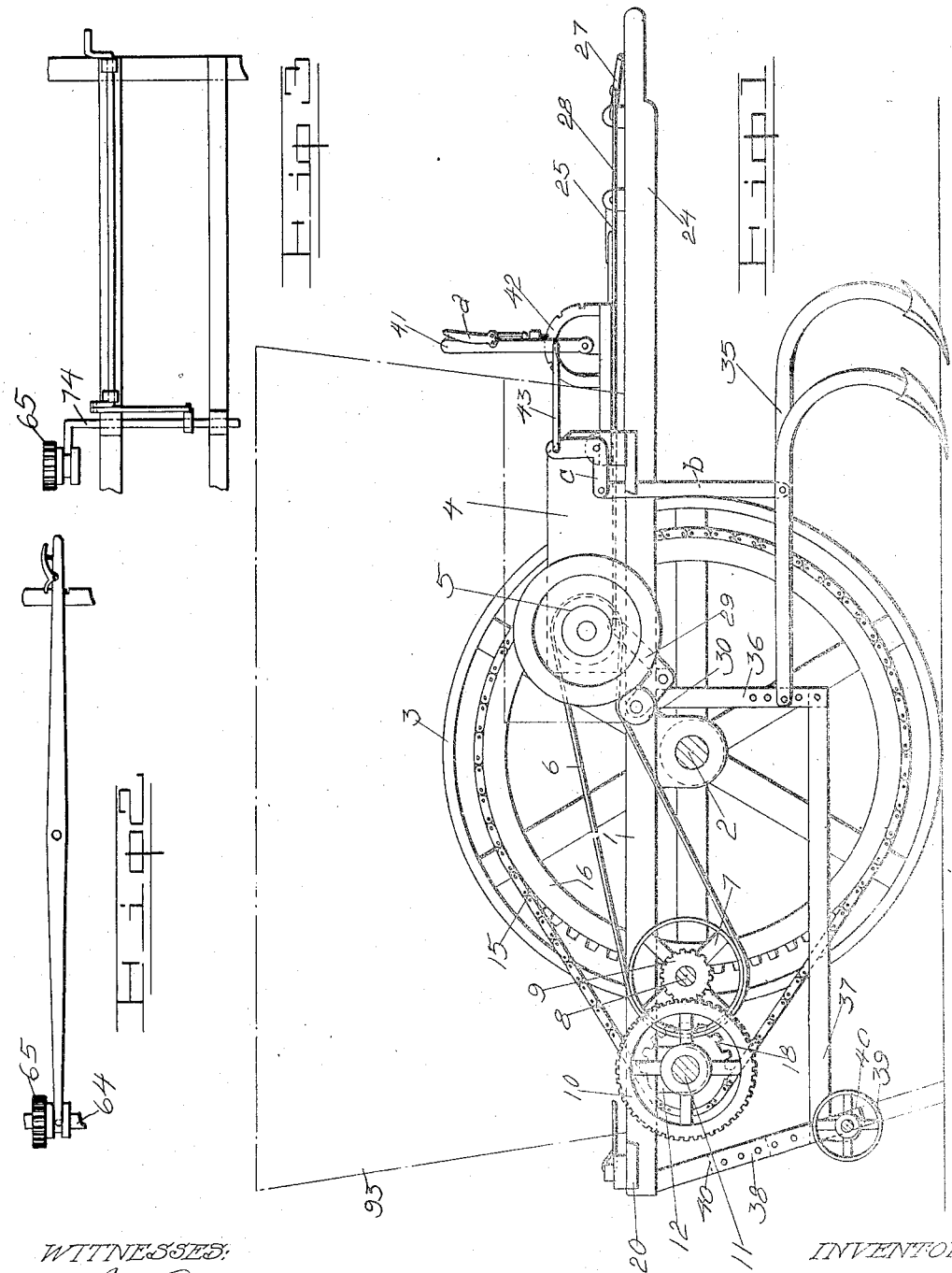

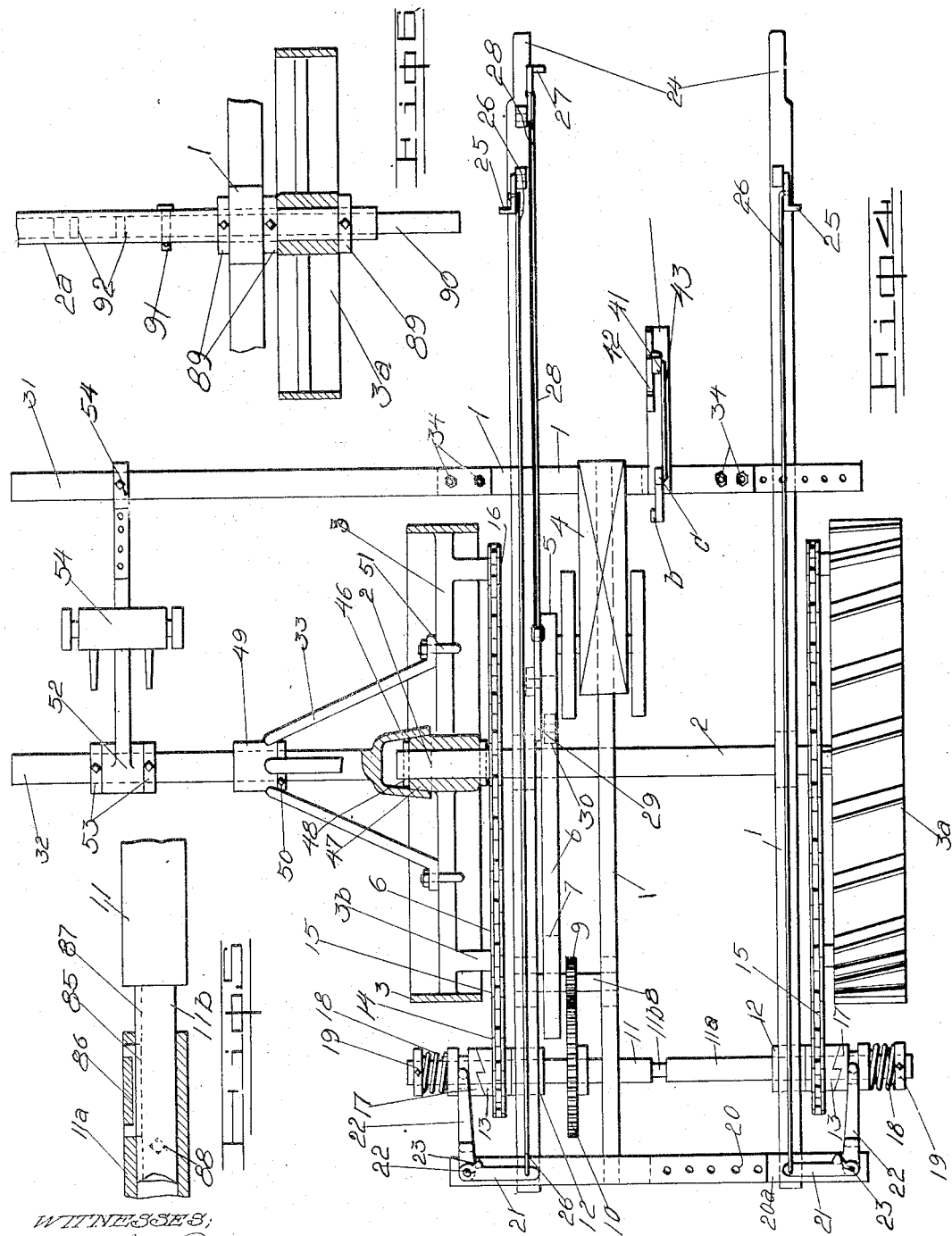

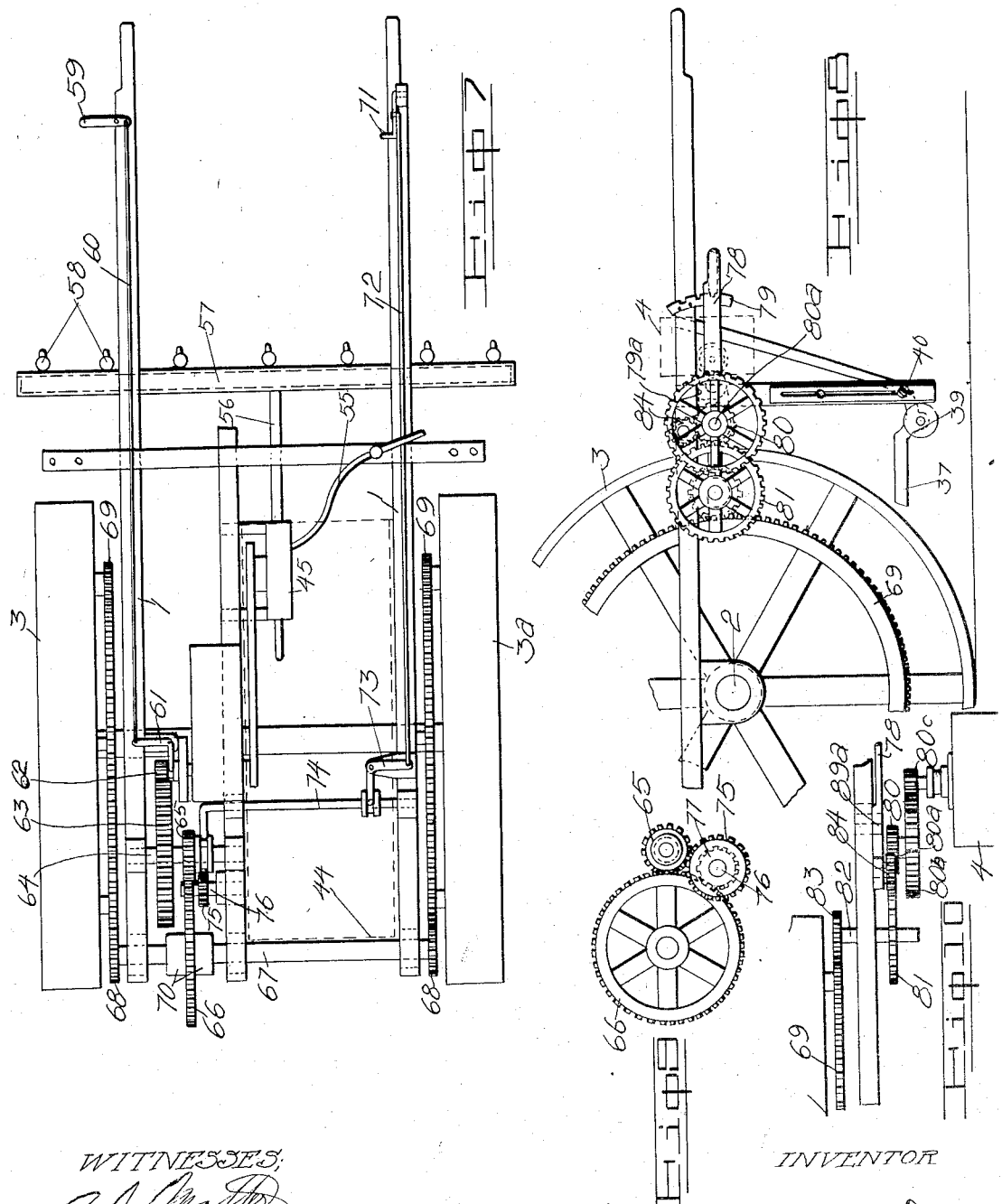

UNITED STATES PATENT OFFICE.

FRANK ALBA McDANIELS, OF PORTLAND, OREGON.

COMBINATION TRACTION-DRIVEN HAND-TOOL.

1,115,854.

Specification of Letters Patent. Patented Nov. 3, 1914.

Application filed February 27, 1913. Serial No. 751,086.

*To all whom it may concern:*

Be it known that I, FRANK ALBA MC-DANIELS, a citizen of the United States, residing at Portland, in the county of Multnomah and State of Oregon, have invented certain new and useful Improvements in Combination Traction-Driven Hand-Tools, of which the following is a specification.

This invention relates to combination traction hand tools and has for its object to provide a farm tractor which is hand controlled, and which is adapted for the attachment of the various farm implements.

A further object is to provide a tractor which is adjustable laterally to adapt it to use in the cultivation of the various crops, and further to adapt it to the employment and operation, either individually or in combination, of any of the implements usually drawn by horses or by hand.

I accomplish these and other objects by the mechanism illustrated in the accompanying drawings, in which—

Figure 1 is a side elevation of the complete device. Fig. 2 is a plan view of a reversing lever. Fig. 3 shows a modified form of reversing mechanism. Fig. 4 is a plan view of Fig. 1, with parts omitted. Fig. 5 is a detail view of the adjustable jack shaft. Fig. 6 shows a detail of an extension attachment for the main shaft, or axle. Fig. 7 is a plan view showing a pump with hose connections for delivering water to the plants being cultivated. Fig. 8 is a detail plan view of the reversing mechanism seen in Fig. 6, and Fig. 9 is an elevation of that seen in Fig. 7. Fig. 10 is a plan view of the mechanism shown in Fig. 8.

Referring to the drawings in detail, 1 represents the frame work, carrying at an intermediate point the axle 2, upon which are mounted traction wheels 3 and 3ª.

At a suitable position upon the frame 1 is fixed an engine 4, to the rear of the axle, where its weight will most effectively counteract the draft upon the machine. A suitable pulley 5 will be attached to the engine for carrying the belt 6 which leads to and operates the pulley 7 fixed upon the shaft 8 carrying the pinion 9 which meshes with the gear 10 fixed upon the jack shaft 11 mounted upon the front end of the frame work, in bearings 12. At the outer side of each of said bearings is loosely mounted a clutch member 13, each having formed thereon a sprocket 14 for carrying the chain 15 which engages upon a sprocket 16 formed upon the inner side of its respective traction wheel, on the brackets 3ᵇ.

Upon the shaft 11, at the outer face of each clutch member 13 is secured a sliding clutch-member 17 held in engagement by the spring 18, bearing against the collar 19. Transversely upon the forward portions of the longitudinal members of the frame is fixed a member 20 for carrying the jointed bell crank 21 at each end. The rearwardly projecting arm 22, engages its respective sliding member of the clutch, and by retracting the arm 21 the lug 23 will engage the arm 22 forcing it with the clutch member outwardly against its respective spring 18 to unclutch the corresponding traction wheel. These movements are employed to accomplish any considerable change in direction, though slight changes in direction are accomplished by manipulation of the handles 24, the jointed arrangement of the bell crank permitting such manipulation, through the lever 25 connected with its respective crank by means of rod 26. Another lever 27 connects, by means of rod 28, with bell crank 29 supported upon the main frame, and carrying upon its farther arm a pulley 30 adapted to bear against the belt 6, and by means of which the power may be quickly applied or released.

Upon each end of the rear end member of the frame is detachably secured an extension 31, and another detachable extension 32 is secured upon the main axle 2, at each side, each being sustained by braces 33 secured to the traction wheel, and rotating therewith. The socket 46 engages upon the hub 47, held in place by pin 48, and the braces extend from collar 49, secured on the extension 32 by means of set screw 50, to the spokes of the wheel 3, where they are secured by clamps 51. The traction wheel 3ª is adapted to be adjusted in the frame, by means of the bolts 34 and the adjustable section 20ª of the member 20, so as to adapt the wheels to the width of the rows being worked.

A tool, such as the cultivator 35, shown in Fig. 1 may be attached at the rear of each wheel to work the soil between the rows of plants. Upon the extended members at each side of the device may be attached, by means of bracket 52, held by set screw 53, another section of the tool 35, or it may be a harrow, plow, seeder or other implement, or lawn mower and the like, as seen at 54. To the main frame are secured the depending bars 36, to which are engaged the tools 35. These bars are sustained by braces 37, engaged at the front end with the extensible depending bars 38, to the lower ends of which are mounted wheels 39 to support the frame when tilting forward.

As seen in Fig. 8, the brace 37 is extended to the rear end and connected with the extensible legs 40. Upon the rear portions of said braces are secured similar wheels 39 to sustain the frame when tilting rearwardly. Similar extensions may be secured upon legs 38. When desired, the traction wheels may be removed and the device will be supported upon said extensible legs for use as a stationary engine, though it may be so used without removing the wheels, by lowering said legs. In manipulating the tools, the operator will release the latch $a$ upon the lever 41 from the sector 42, and by throwing the lever rearwardly, the link 43, which is connected with bell crank $c$, will cause the latter to rock on its support and raise the tools 35, which are connected therewith by means of link $b$.

In Fig. 7 is seen a tank 44, which may be filled by means of pump 45, from which the water or spraying material may be forced through hose pipes 55, or through pipe 56 leading to the transverse tube 57, which is provided with sprayers 58, for delivering the contents of the tank as desired. In operation the lever 59 will be thrown forward and by means of connecting rod 60 and bell crank 61 the pinion 62 on the engine shaft will be placed in mesh with gear 63 fixed on shaft 64 which also carries the sliding pinion 65 meshing with gear 66, supported by the differential in the casings 70, carried on the front end of the frame. Upon said shaft 67 are fixed gears 68 which mesh with their respective drive gears 69 upon the traction wheels, thereby imparting motion to the machine. To reverse the direction of the machine the lever 71 will be thrown to the rear and by means of connecting rod 72 and bell crank 73 the shifting rod 74 will shift the pinion 65 from engagement with gear 66 into engagement with pinion 75 on the shaft 76, which carries also the pinion 77 meshing at all times with the gear 66, and moving the machine in the opposite direction.

In Figs. 8 and 10 is seen a modification in which the engine and operative mechanism are placed farther to the rear of the axle. In this case to obtain advance movement the lever 78 will be disengaged from the sector 79 and lowered on the pivot 79$^a$ from the neutral position, as seen in Fig. 8, thereby placing pinion 80 in mesh with gear 81 fixed on the shaft 82, which carries drive pinion 83 meshing with gear 69. Pinion 80 is carried by said shaft 80$^a$ on which is fixed the gear 80$^b$ meshing with engine pinion 80$^c$. To reverse this movement the lever 78 will be raised to the upper notch in the sector, which will disengage pinion 80 and place pinion 84, carried on a bracket from the lever, into mesh with gear 81 thereby driving it in the opposite direction.

In Fig. 5 is seen a detail of the adjusting mechanism of the shaft 11. Upon the reduced portion 11$^b$ is slidably secured a sleeve 11$^a$ upon the feather key 85 in the key way 86, and slidable in the groove 87 of the shaft. The sleeve may be secured at any desired point by the set screw 88.

In Fig. 6 is seen an extensible axle 2$^a$ formed tubular and carrying the traction wheels 3 and 3$^a$, and the frame 1 which are mounted in place by means of collars 89, which may be fixed at any desired point thereon by means of usual set screws. Within the tube is seen an extensible spindle 90, adjustably secured therein by means of bolts 91 through the apertures 92 in the axle.

By means of this device any of the usual farm implements may be attached and operated, and a spraying mixture may be, either at the same time, or independently, applied.

In the use of plows, or cultivator shovels, or the like, the strain thereon, in raising the soil, will be utilized in gaining traction for the traction wheels. This allows of dispensing with the land bar and with very much of the friction. The tank 44 may be placed at any convenient position in the frame, and there may also be secured thereon a box 93.

Having described my invention what I claim, is—

1. The combination in a traction driven hand tool of a main frame, an axle mounted centrally therein, traction wheels mounted on said axle, a shaft mounted adjacent the axle, a gear wheel mounted for independent movement, at each end portion thereof and operatively connected with its corresponding traction wheel, a clutch engageable with each of said gear wheels, an operating lever at each side of the frame for manipulating it, means mounted upon each lever operatively connected with its corresponding clutch, for independently actuating the corresponding traction wheel, and roller carrying extensible legs mounted upon said frame for supporting the traction wheels above ground and adapted to be adjusted to and locked at any desired position.

2. The combination in a traction driven hand tool of a laterally adjustable frame, an axle mounted transversely therein, traction wheels adjustably mounted on said axle, a shaft mounted adjacent the axle, a gear wheel mounted for independent movement at each end portion thereof, and adjustable longitudinally thereon, each being operatively connected with the corresponding traction wheel, a clutch engageable with each of said gear wheels, an operating lever at each side of the frame for manipulating it, and means mounted upon each lever operatively connected with the corresponding clutch for independently actuating it.

In testimony whereof I affix my signature in presence of two witnesses.

FRANK ALBA McDANIELS.

Witnesses:
   A. J. MATTER,
   E. E. HECKBERT.